Patented Sept. 5, 1950

2,521,431

UNITED STATES PATENT OFFICE 2,521,431

ACTIVATION OF FRIEDEL-CRAFTS CATALYST

David C. Walsh, Jr., and Henry G. Schutze, Baytown, Tex., assignors, by mesne assignments, to Standard Oil Development Company, Elizabeth, N. J., a corporation of Delaware No Drawing. Application July 8, 1948, Serial No. 37,526

4 Claims. (Cl. 260—85.3)

1

The present invention is directed to an improved process for the polymerization of olefins in the presence of a Friedel-Crafts type catalyst. More particularly, the invention is directed to the low temperature polymerization of olefinic mixtures in the presence of a Friedel-Crafts catalyst and a promoter for the reaction.

Prior to the present invention it has been customary to copolymerize tertiary olefins, such as isobutylene and diolefins, such as butadiene or isoprene, at low temperatures of the order of —50° F. to —175° F. to obtain a product which is suitable for vulcanization. The process is extremely sensitive to impurities and it is necessary that expensive expedients be resorted to in order to obtain purified reactants. The nature of the impurities which are removed from the reactants comprise acidic material, unsaturated polymers of relatively low molecular weight, oxygenated bodies, sulfur, nitrogen, and various other extraneous materials which may find their way into the system in which the polymerization is effected. The purification steps comprise various chemical and physical treating methods to obtain the purified product.

The nature of the impurities has made it difficult to obtain the reactant hydrocarbons in substantially pure condition. From time to time it has, therefore, been necessary, in order to obtain best results, to increase the concentration of the Friedel-Crafts catalyst which is employed. Ordinarily, the catalyst is employed in a solution of an organic halide in a concentration of about 0.05 to 0.5 gram of aluminum chloride per 100 c. c. of solvent. The usual solvent employed is an alkyl halide, such as methyl chloride. In order to maintain the efficiency of the catalyst, at times it has been necessary to increase the concentration of aluminum chloride to the upper limit given which may make for an unsatisfactory reaction in view of the extremely active nature of these concentrations of catalyst solution.

The reaction is also very sensitive to the variations in the concentration of the Friedel-Crafts catalyst dissolved in the solution and to the activity of the solution. Both the activity and the concentration are related to the nature of the impurities in either the hydrocarbon reactants or in the alkyl halide employed as a solvent for the catalyst and a diluent for the reaction. Thus, if the alkyl halide solvent contains a large amount of impurities, it will be necessary to compensate for these impurities by the employment of additional catalyst to overcome the deleterious effect of the impurities in the alkyl halide.

2

In accordance with the present invention, the polymerization of olefins in the presence of a Friedel-Crafts type of catalyst at low temperatures is improved by the addition to the reaction mixture of controlled amounts of water. It has been found, that by adding water to the alkyl halide, such as methyl chloride, which is employed as a solvent for the catalyst, in an amount in the range between 0.01 and 4 mols per mol of aluminum chloride dissolved in the solvent, the polymerization reaction may be improved to the extent of requiring substantially less catalyst in the catalyst solution and also improving the yields of the polymer produced. In short, adding water in controlled amounts to the solvent activates the aluminum chloride to the extent that greater quantities of polymer are produced for a given amount of catalyst than was possible heretofore.

In the preferred practice of the present invention, both the fresh feed of olefinic stock and the solvent such as methyl chloride are thoroughly dehydrated. A controlled amount of water is added to the dehydrated solvent which is then employed in the preparation of the catalytic solution. The catalyst is dissolved into the methyl chloride to which the controlled amount of water has been added and both the fresh feed and the catalytic solution are next separately chilled to the desired low temperature and discharged into a vessel provided with a mixing means. The components to the reaction are mixed as rapidly as possible and then allowed to remain in contact for a predetermined period of time. After the reaction has proceeded a sufficient period of time for the formation of the desired polymer, it is terminated by suitable means, such as by adding water to the reaction mixture, and the polymer is then separated as the desired product.

The operation described above is generally applicable to the polymerization of olefins in the presence of a Friedel-Crafts catalyst. Of particular interest at the present time is the employment of this type of reaction to form vulcanizable gums by the polymerization of isobutylene, a mono-olefin, in the presence of a small amount of diolefin, such as butadiene or isoprene. Suitable Friedel-Crafts type catalysts for promoting this polymerization are aluminum chloride, aluminum bromide, ferric chloride, titanium tetrachloride and boron trifluoride, and the like. The polymerization reaction must be carried out at relatively low temperatures with a preferred range of —100° to —175° F. A catalyst may suitably be prepared by agitating dehydrated methyl chloride with powdered aluminum chloride at a temperature of about −20° F. to give a solution of a concentration of about 0.05 to 0.5 gram of AlCl₃ per 100 cc. of methyl chloride. A hydrocarbon feed stock comprising isobutylene having admixed therein from 2 to 20% of isoprene based on the isobutylene may be dehydrated by passing it over a bed of calcium chloride or other suitable dehydrating agent. The hydrocarbon feed stock containing the unsaturated polymer is then chilled to about −140° F. and passed into a vessel. The solution of aluminum chloride in methyl chloride is chilled to a temperature slightly above the freezing point of methyl chloride, say, −120° F., and the catalyst sprayed into the vessel through a nozzle while the diolefin-mono-olefin mixture in the vessel is being violently agitated. From 10 to 20 volume per cent of catalyst solution may be employed which may be added over a period ranging from about ten seconds to ten minutes. After the reactants have been in contact the desired interval of time, the reaction may be terminated by the addition of a large excess of water or alcohol to the vessel. The polymer is then recovered and carefully washed to remove the catalyst residue, after which the polymer may be dried and compounded as is desired. In the quenching step, the catalyst is intentionally destroyed in order to prevent further action beyond the desired polymerization. This quenching step can be effected by any hydrolyzing agent such as alcohol or water, but it is preferred to use hot water.

Although the foregoing describes a batch polymerization process, it is understood that the process may be made to operate on a continuous basis by constantly adding fresh feed and catalyst to the agitated reaction mixture and constantly removing the product as a slurry along with unconverted feed and methyl chloride.

The invention will be further illustrated by the following examples in which isobutylene and isoprene diluted with methyl chloride were polymerized in a batch reactor. The methyl chloride was purified by treatment with phosphoric anhydride. A catalyst solution containing aluminum chloride in an amount of 0.070 gram of aluminum chloride per 100 cc. of solution was employed. To a chilled reactor was introduced a measured amount of a precooled feed comprising isobutylene, isoprene and methyl chloride. The feed contained 25% by volume of isobutylene and a small amount of isoprene, amounting to 4% by volume of the isobutylene. The feed stock was charged to a cold reactor which had been dried, purged and blanketed with dry nitrogen. A stirring mechanism was attached and a means was provided for injection of catalyst solution. The feed stock was cooled to −145° F. and injection of catalyst solution was started and maintained at a constant rate. After the desired amount of catalyst had been added the reactant mass, which was in the form of a slurry, was agitated for an additional two minutes and the reaction stopped by addition of alcohol. The reacted material was then further quenched by the addition of hot water. The rubbery material was kneaded in the presence of hot water until a crumbly body was formed. The crumbs of polymer were strained and squeezed to remove as much entrained water as possible until the water content was in the range of 20%. The weight of the polymer was recorded and corrected for the amount of water remaining in the polymer mass. From the data obtained on the weight of polymer produced, the catalyst efficiency, conversion and the aluminum chloride polymer relationships were calculated.

Runs in accordance with the foregoing procedure were conducted without addition of water to the methyl chloride employed as a catalyst solvent and with the addition of water to the methyl chloride employed as the solvent. Comparative runs similar in every respect were then made with the aluminum chloride catalyst solution containing no water and with the aluminum chloride catalyst solution to which water in an amount of 0.03 mol per mol of aluminum chloride had been added to the methyl chloride solvent. The data obtained from these runs are shown in the following table:

Table

| Catalyst Efficiency, Lb./Lb. | Conversion, Per Cent | AlCl₃ Added, Part | Polymer Produced, Parts |
|---|---|---|---|
| Catalyst Prepared from Pure Methyl Chloride | | | |
| 2,140 | 23.8 | .029 | 62 |
| 2,470 | 30.4 | .032 | 79 |
| 2,360 | 35.4 | .039 | 92 |
| 2,430 | 45.7 | .049 | 119 |
| 2,525 | 53.5 | .055 | 139 |
| 2,505 | 62.7 | .065 | 163 |
| Catalyst Prepared from Methyl Chloride Containing 0.03 Mol of Water per Mol of Aluminum Chloride | | | |
| 2,140 | 23.1 | .028 | 60 |
| 2,660 | 32.6 | .032 | 85 |
| 2,745 | 41.1 | .039 | 107 |
| 2,820 | 54.2 | .050 | 141 |
| 2,665 | 61.5 | .060 | 160 |
| 2,620 | 71.5 | .071 | 186 |

It will be seen from the foregoing data that the amount of polymer produced is greatly increased by the addition of water in the stated amount to the catalytic solution. It will be observed that in the runs in which aluminum chloride in excess of about .03 part was employed, in each case a substantial increase in yield was obtained. For example, when using .032 part of aluminum chloride without the addition of water 79 parts of polymer were produced, whereas under similar condition when water was present 85 parts of polymer were obtained. The same holds true throughout all the runs that were conducted with or without the addition of water to the methyl chloride solvent. In the case where .05 part of aluminum chloride was added 119 parts of polymer were obtained without water, whereas with water in the solvent 141 parts of polymer were obtained. It will be noted that the column of data showing the catalyst efficiency directly reflects the improvement obtained in the present invention.

It will be preferred to use an amount of water in the methyl chloride employed as the solvent in the preferred range of about 0.01 mol to about 2 mols per mol of aluminum chloride in the catalytic solution.

One feature of the present invention which is not reflected by the data is that the activity of the catalyst solution, prepared by dissolving aluminum chloride in methyl chloride to which water has been added, has been observed to increase slowly with time even though the catalyst was maintained during the period of observation at the temperature of −40° F. and lower. It will be seen, therefore, that one feature of the present invention is preparing an improved catalytic solution including a Friedel-Crafts type catalyst, methyl chloride solvent and water which improves in activity on standing. It appears that the rate of reaction of water dissolved in methyl chloride is substantially slower than the rate of reaction of water vapor with solid aluminum chloride; thus, in accordance with the present invention, it may be possible to increase the activity of aluminum chloride catalyst solution gradually and under controlled conditions for polymerization of olefins at low temperatures.

The present invention has been described and illustrated by examples in which isobutylene and isoprene have been employed as the hydrocarbon reactants. It is to be understood, of course, that other hydrocarbons may be employed. For example, tertiary mono-olefins, such as tertiary pentylenes, heptylenes, hexylenes and octylenes, may be used in lieu of isobutylene although the latter is to be preferred. Similarly, other diolefins besides isoprene may be used. For example, methyl butadienes, 1,3 pentadiene, the conjugated hexadienes, heptadienes and octadienes may be also used in lieu of isoprene and 1,3 butadiene although the latter are preferred reactants.

Similarly, methyl chloride has been illustrated as the alkyl halide solvent whereas actually other alkyl halides, such as methyl bromide, ethyl bromide, ethyl chloride and the like, may be used although methyl and ethyl chloride will be preferably used.

The hydrocarbon reactants including a diolefin and mono-olefin have been employed in concentrations of 4% and 25%, respectively, of the hydrocarbon mixture. Actually, smaller and larger quantities of the diolefin and smaller and larger quantities of the mono-olefin may be employed. For example, as little as 1.5% by volume of diolefin may be used and as much as 120% of diolefin based on the mono-olefin may be used in the feed stock. The amount of mono-olefin may also be varied very widely from about 5% up to about 60% of the said hydrocarbon mixture. In each case the remainder will usually be the alkyl halide such as methyl chloride employed as a diluent. Under some conditions such as that where reactions are allowed to take place in space it may be possible to omit substantially entirely the employment of a diluent for the reaction. In these cases the relative amounts of mono-olefin and diolefin stated above will be placed on a 100% basis. When the methyl chloride diluent is omitted some methyl chloride will still be used as a solvent for the Friedel-Crafts catalyst and to this solvent will be added water in the indicated quantities.

The nature and objects of the present invention having been thus described and illustrated, what is claimed as new and useful and is desired to be secured by Letters Patent is:

1. A process for polymerizing a mixture of anhydrous tertiary olefin and diolefin at a temperature in the range between −50 and −175° F. which comprises maintaining said mixture in the presence of a Friedel-Crafts catalyst at a temperature in the range of −50 and −175° F., said Friedel-Crafts catalyst having been dissolved in alkyl halide to which has been added an amount of water in the range between 0.01 and 4 mols based on the Friedel-Crafts catalyst, for a sufficient interval of time to form a polymer, and recovering said polymer.

2. A method in accordance with claim 1 in which the Friedel-Crafts catalyst is aluminum chloride and the alkyl halide is methyl chloride.

3. A method for producing a rubber polymer which includes the steps of chilling a dehydrated mixture including isobutylene in the range of about 5 to about 60% by volume, isoprene in the range of .3% to 20% by volume based on the isobutylene and methyl chloride in an amount sufficient to make up the difference, at a temperature in the range of −50 to −175° F., forming a chilled catalyst solution including aluminum chloride and methyl chloride containing an amount of water in the range from 0.01 mol to 4 mols based on the aluminum chloride, contacting said catalyst solution with said mixture under conditions to form a polymer, stopping said reaction after said polymer is formed, and recovering said polymer.

4. A process for producing a rubbery polymer which includes the steps of forming a dehydrated feed stock comprising isobutylene, methyl chloride, and isoprene, chilling the mixture to a polymerization temperature in the range of −50 to −75° F., forming a solution of a solid Friedel-Crafts type catalyst in methyl chloride to which has been added an amount of water in the range between 0.01 and 4 mols per mol of Friedel-Crafts catalyst, chilling said solution of Friedel-Crafts catalyst to a temperature in the range between −50° and −75° F., contacting said chilled catalyst solution with the chilled feed mixture for a sufficient interval of time to polymerize said feed mixture, adding to the reactants a material which destroys the Friedel-Crafts catalyst and recovering rubbery polymer formed in the reaction.

DAVID C. WALSH, JR.
HENRY G. SCHUTZE.

REFERENCES CITED

The following references are of record in the file of this patent:

UNITED STATES PATENTS

| Number | Name | Date |
|---|---|---|
| 2,433,025 | Calfee et al. | Dec. 23, 1947 |

OTHER REFERENCES

Nature 158, July 20, 1946 (pages 94 and 95).